J. L. HALL & A. F. KNIGHT.
SYSTEM OF DISTRIBUTION.
APPLICATION FILED AUG. 21, 1905.
921,693.
Patented May 18, 1909.
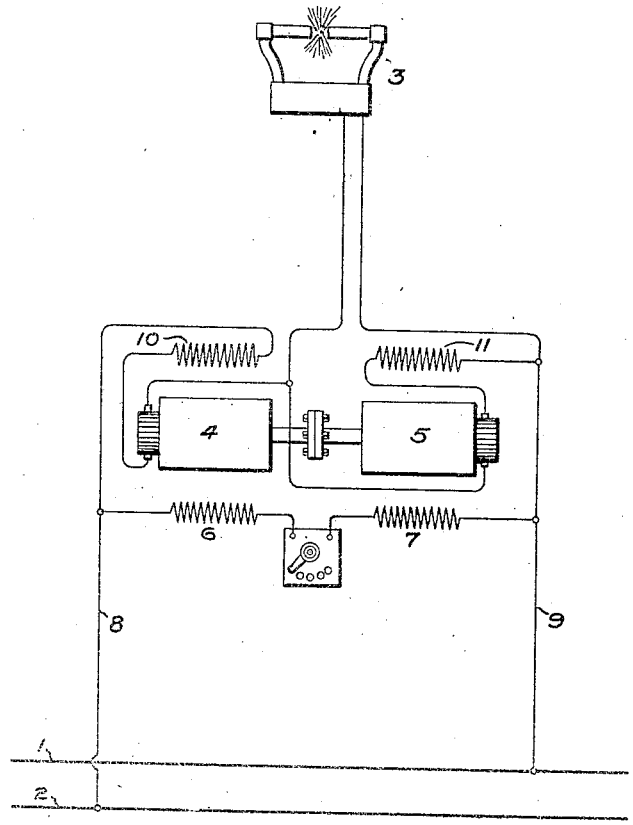
Witnesses:
Marcus L. Byng.
Helen Orford
Inventors:
John L. Hall,
Arthur F. Knight,
by Albert G. Davis Att'y.

UNITED STATES PATENT OFFICE.

JOHN L. HALL AND ARTHUR F. KNIGHT, OF SCHENECTADY, NEW YORK, ASSIGNORS TO GENERAL ELECTRIC COMPANY, A CORPORATION OF NEW YORK.

SYSTEM OF DISTRIBUTION.

No. 921,693.　　　Specification of Letters Patent.　　　Patented May 18, 1909.

Application filed August 21, 1905. Serial No. 274,989.

*To all whom it may concern:*

Be it known that we, JOHN L. HALL and ARTHUR F. KNIGHT, citizens of the United States, residing at Schenectady, county of Schenectady, State of New York, have invented certain new and useful Improvements in Systems of Distribution, of which the following is a specification.

In the use of search lights and projectors on ordinary supply circuits on shipboard or elsewhere, it is necessary to provide in series with each lamp or projector a large amount of regulating resistance. Inasmuch as this involves an excessive waste of energy in the operation of the lamp or projector, it is one of the objects of our invention to provide an improved system of supply whereby the use of such resistance may be avoided.

To this end our invention consists in the provision of means whereby the light, or other translating device may be supplied with current the voltage of which is automatically regulated in accordance with its requirements.

In the case of search lights or projectors it is necessary that the voltage at the terminals of the lamp decrease as the current tends to increase. In ordinary practice as above mentioned, this result is obtained by the use of series resistances. In accordance with our invention we provide a motor generator set of suitable capacity and provide it with a novel arrangement of winding connections whereby the search light or projector, or other translating device may be supplied with current as its requirements demand.

The novel features which characterize our invention are pointed out with particularity in the appended claims.

The invention itself will be better understood by reference to the following description taken in connection with the accompanying drawings which represent diagrammatically one of the various embodiments which our invention may assume in practice.

Referring to the drawings, the main source of current is indicated conventionally by supply mains 1 and 2. The projector which is to receive current indirectly from these mains is indicated at 3 and may be of any desired type. The particular construction of the projector is not important so far as our present invention is concerned. As an illustration, however, of a projector to which our system of current supply may be applied, reference may be had to the description of the projector in the United States Patent No. 567,227.

The arrangement for supplying current to the projector consists of a motor generator set comprising the direct connected armatures 4 and 5, each having its own field exciting windings. Instead of being direct connected it is of course obvious that the armatures might be driven synchronously with each other in any other suitable and well known way. Each machine is excited by two field windings, one a shunt winding and the other a series winding. The shunt winding for the armature 4 is indicated at 6, and for the armature 5 at 7. These windings are shown as connected in series with each other across the leads 8 and 9 extending from the supply mains 1 and 2. The series windings of the two machines are indicated at 10 and 11. The winding 10 is in series with the armature 4, and the winding 11 in series with the armature 5, while both armatures with their series windings are connected across the leads 8 and 9.

The projector 3, representative of any translating device, is connected across the generator armature 5 and its series winding 11.

In connecting the series windings it is to be noted that the series winding 10 for the motor armature 4 is connected so as to assist the shunt winding 6, while the series winding 11 for the generator armature 5 is so connected as to oppose the shunt field 7. Now as the arc between the electrodes in the search light or projector increases in length as the carbons burn away, the current which the lamp takes decreases. The series field 11 of the generator being thus weakened its counter active effect on the magnetization due to the shunt winding 7 decreases, and thus the generator field is strengthened. The current in the series winding 10 of the motor, being likewise decreased, thereby causes a corresponding weakening in the field strength of the motor. The motor may thus be caused to speed up and drive the generator armature faster. The generator voltage may thus be increased both by the strengthening of the generator field and by the increase in the speed at which the armature is driven by the motor. The potential across the lamp terminals and across the shunt field magnet of the lamp thus causes the lamp to feed in the usual manner to bring the electrodes toward each other. Thus the same result is accomplished as by the use of a resistance in series with the lamp. With resistance present the lengthening of the arc causes a fall in current thus decreasing the drop in potential across the resistance and so increasing the voltage across the arc terminals. By the use of our invention the same result is secured without the waste of energy in the resistance.

It is obvious that numerous modifications may be made in the embodiments of our invention without departing from the spirit thereof, for which reason we do not wish to be limited to the precise details shown and described.

What we claim as new and desire to secure by Letters Patent of the United States, is.

1. The combination of a translating device, a motor-generator set for supplying current to said translating device, and windings for said motor-generator set arranged to increase the voltage supplied to said translating device as the current tends to decrease and vice versa.

2. The combination of a motor-generator set, a winding for each member of the set provided with practically constant excitation, a series winding for each member of the set connected in the case of one member to assist the constant excitation, and in the case of the other member to oppose it, and a translating device connected across one member of said set.

3. The combination of a translating device, a motor-generator set for supplying current thereto of variable voltage, the motor element of the set tending to increase in speed as the current in the translating device lessens, while the generator element tends to increase in voltage.

4. A motor-generator set for regulating the voltage of current supplied to a translating device, the generator element being differentially wound, and the motor element being compound wound.

In witness whereof we have hereunto set our hands this 18th day of August, 1905.

JOHN L. HALL.
ARTHUR F. KNIGHT.

Witnesses:
BENJAMIN B. HULL,
HELEN ORFORD.